April 7, 1931.  R. A. BROOKS  1,799,211
PRESSURE CONTROLLING VALVE
Filed Jan. 26, 1927
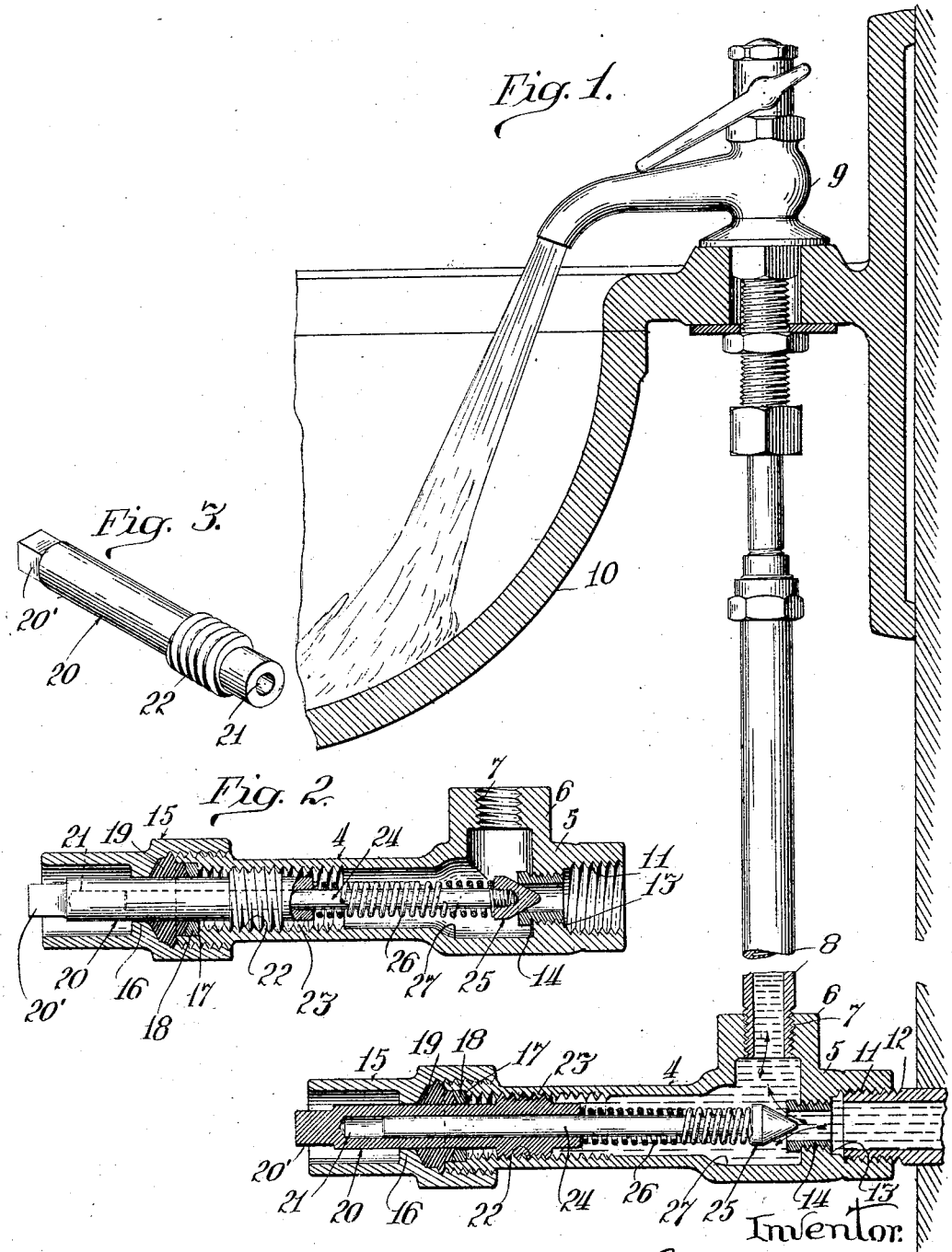

Patented Apr. 7, 1931

1,799,211

UNITED STATES PATENT OFFICE

ROBERT A. BROOKS, OF CHICAGO, ILLINOIS

PRESSURE-CONTROLLING VALVE

Application filed January 26, 1927. Serial No. 163,628.

My invention relates to valves for controlling the volume, pressure and velocity of water flow, and has for its object to provide a valve of improved construction that will operate noiselessly, or substantially so, whether used under high pressure or low pressure, and by which the pressure under which the water is discharged may be accurately and easily regulated; also one of simple and inexpensive design, but characterized by great durability and efficiency. I accomplish my object as illustrated in the drawings and hereinafter described. What I regard as new is set forth in the claims.

In the accompanying drawings,—

Fig. 1 is a view principally in vertical section, illustrating my improved valve applied to the water supply pipe of a wash basin;

Fig. 2 is a longitudinal sectional view of the valve showing it closed under the action of the spring; and Fig. 3 is a perspective view of the control member.

My present valve is in the nature of an improvement upon that which constitutes the subject-matter of my pending application, Ser. No. 87,201, filed February 10, 1926, and embodies some of the generic improvements claimed in said application, but it possesses important advantages over that construction.

Referring to the drawings, 4 indicates the body of the valve, which, in the main, is cylindrical, or in the form of a tube, and has an enlargement 5 at one end, provided with a laterally extending head or boss 6. Said boss is threaded, as shown at 7, for the reception of a pipe 8, through which water is delivered to the point of discharge, such as a faucet 9 associated with a wash bowl 10, but, obviously, the pipe 8 may lead to any other appliance, such as the flush tank of a water closet.

The enlargement 5 is axially threaded, as shown at 11, for connection with a supply or service pipe 12, and at the inner end of such threaded portion it is provided with an internal shoulder 13 threaded to receive a short sleeve 14 the inner margin of the inner end of which forms a valve seat, as will be more particularly explained later.

The opposite end of the body 4 is externally threaded to receive a tubular extension 15, having an intermediately disposed annular flange 16 on the inside thereof, that overlies the adjacent end of the body. The latter end is counter-bored to provide a shoulder 17, on which rests a brass washer 18, and between said washer and the flange 16 is a packing 19, the marginal portion of which extends over the end of the body. By screwing the extension 15 down on the body obviously the packing may be compressed to form a tight closure at that end of the valve and prevent leakage around the control member. This control member is preferably in the form of a cylindrical sleeve or stem 20, made square or otherwise non-circular at its outer end, so that it may easily be rotated, as shown at 20', and counter-bored at its inner end to provide an elongated socket 21 that extends to near the opposite end of said stem and is closed at its inner end. It is also provided, preferably intermediately of its length, with an externally threaded enlargement 22 which engages threads 23 on the inner surface of the body, so that said sleeve may be adjusted longitudinally thereof. The outer end portion of said sleeve extends through the packing 19 and flange 16, the latter serving as a guide for it.

Extending into and fitting closely but slidably in the socket 21 is a valve stem 24, which at its outer end carries a conical valve member 25, preferably screwed thereto, as shown in Fig. 2. This valve is adapted to enter the sleeve 14 so that its taper surface will engage and be closely seated upon the inner margin of the inner end of said sleeve, thus providing a linear annular closure.

A spring 26 is mounted on the valve stem 24 between the valve 25 and the inner end of the control sleeve 20, its length being such that by adjustment of said sleeve longitudinally of the valve body said spring may be put under any desired degree of tension, or may be relieved altogether of tension, and allowed a limited range of free movement along the valve stem.

Manifestly by longitudinal adjustment of the control sleeve to put the spring 26 under tension, the valve 25 will be pressed on its seat with more or less force, so that it will operate to control the volume, pressure and velocity of the water admitted to the chamber 27 in the valve body, and through it to the delivery pipe 8, as explained more in detail in my said pending application. In low pressure installations the control sleeve 20 would be backed up so as to relieve the spring from pressure, and permit the valve to open and close under service pressure, in accordance with the opening or closing of the faucet.

By providing the extended bearing for the valve stem in the socket 21 of the control member, the valve stem is held against vibration, the extended bearing furnished by the shoulder 16 aiding in this, and by the use of the conical valve member and the linear seat, water hammer is prevented, and the valve is made self cleaning, as also pointed out in said application.

If it be desired to completely shut off the flow of water through the valve temporarily, this may be done without applying crushing pressure to the spring, by screwing the control member down until the closed end of the socket 21 bears against the end of the valve stem, after which further movement of said sleeve will positively apply endwise pressure to the valve stem without any further telescopic movement of said parts, and therefore without further increasing the tension on the spring. By fitting the valve stem closely in the socket 21, it has the suction effect of a plunger or piston, which makes the valve close more gradually, and aids in preventing vibration and water-hammer.

What I claim as my invention and desire to secure by Letters Patent, is—

1. A pressure regulating and shut-off valve comprising an elongated valve body having a chamber provided with an axial inlet opening at one end and a lateral outlet opening branching from the side of said body, an internally threaded shoulder in said inlet opening, a valve-seat sleeve having threaded engagement with said shoulder and being provided with a cylindrical bore, a conical valve adapted to have line contact with the inner end of said cylindrical bore, a stem for said valve, a control member having a relatively long axial socket therein in which said stem has closely fitting guided engagement, said socket being closed adjacent to the outer end of said control member, a compression spring coiled about said stem and confined between the inner end of said control member and said conical valve, a thread on the exterior of said control member screwing into an internal thread in said elongated body, screwing of said control member inwardly and outwardly in said body increasing and decreasing the pressure of said spring for regulating the pressure of the water discharged through said outlet opening, said threads on the control member and in said valve body permitting the control member to be screwed inwardly for bringing the closed end of said socket directly against the end of said stem for positively seating said conical valve against said valve-seat sleeve whereby the device functions as a positive shut-off valve, an extension screwed over the outer end of said valve body, an internal shoulder projecting inwardly from said extension and serving as a guide for said control member, packing confined between said internal shoulder and the adjacent end of the valve body, and a sleeve portion on said extension projecting outwardly beyond said internal shoulder in spaced relation to said control member for substantially enclosing the outer portion of said control member.

2. A pressure regulating and shut-off valve comprising an elongated valve body having a chamber provided with an axial inlet opening at one end and a lateral outlet opening branching from the side of said body, an internally threaded shoulder in said inlet opening, a valve-seat sleeve having threaded engagement with said shoulder and being provided with a cylindrical bore, a conical valve adapted to have line contact with the inner end of said cylindrical bore, a stem for said valve, a control member having a relatively long axial socket therein in which said stem has closely fitting guided engagement, said socket being closed adjacent to the outer end of said control member, a compression spring coiled about said stem and confined between the inner end of said control member and said conical valve, a thread on the exterior of said control member screwing into an internal thread in said elongated body, screwing of said control member inwardly and outwardly in said body increasing and decreasing the pressure of said spring for regulating the pressure of the water discharged through said outlet opening, said threads on the control member and in said valve body permitting the control member to be screwed inwardly for bringing the closed end of said socket directly against the end of said stem for positively seating said conical valve against said valve-seat sleeve whereby the device functions as a positive shut-off valve, a counterbore in the outer end of said valve body, a ring seating in the inner end of said counterbore, packing extending into said counterbore and engaging said ring, an extension screwed over the outer end of said valve body, an internal shoulder projecting inwardly from said extension, said internal shoulder serving as a guide for said control member and serving to compress said packing, and a sleeve portion on said extension projecting outwardly beyond said internal shoulder in spaced relation to said control member for substantially enclosing the outer portion of said control member.

ROBERT A. BROOKS.